United States Patent Office 3,702,891
Patented Nov. 14, 1972

3,702,891
INSECTICIDAL COMPOSITION COMPRISING A SYNERGISTIC MIXTURE OF 5 - BENZYL - 3 - FURYLMETHYL d - TRANS-CHRYSANTHEMATE AND N-(3,4,5,6 - TETRAHYDROPHTHALIMIDO)- METHYL d-TRANS-CHRYSANTHEMATE
Keizo Hamuro, Nishinomiya, Japan, assignor to Sumitomo Chemical Company, Ltd., Osaka, Japan
Filed Nov. 17, 1970, Ser. No. 90,412
Claims priority, application Japan, Nov. 19, 1969, 44/93,287
Int. Cl. A01n 9/22, 9/28
U.S. Cl. 424—274          1 Claim

ABSTRACT OF THE DISCLOSURE

An insecticidal composition having low toxicity and rapid effect which comprises, as an active ingredient, a mixture of 5-benzyl-3-furylmethyl d-trans-chrysanthemate and N - (3,4,5,6 - tetrahydrophthalimide)-methyl d-trans-chrysanthemate.

---

This invention relates to an insecticidal composition prepared by mixing two kinds of known chrysanthemate type insecticides, thereby overcoming the drawbacks of the individual insecticides and making it possible to synergistically increase the insecticidal effects thereof.

More particularly, the present invention pertains to an insecticidal composition having rapid knockdown effect (hereinafter abbreviated to "K.D.") and prominent killing effect, the said composition being prepared by mixing 5-benzyl-3-furylmethyl d-trans-chrysanthemate [hereinafter referred to as "the compound (I)"] and N-(3,4,5,6-tetrahydrophthalimide)-methyl d - trans - chrysanthemate [hereinafter referred to as "the compound (II)"], and the mixing ratio of the compound (I) to the compound (II) being within a range between 9.5:0.5 and 0.5:9.5.

The compound (II) is a low toxic insecticide having an extremely rapid K.D. effect on so-called sanitary injurious insects such as houseflies, mosquitoes, cockroaches, etc. and on agricultural injurious insects, and the K.D. effect thereof is the most excellent among the chrysanthemate type compounds. However, the compound (II) has such drawback that when used singly, it is not always prominent in killing effect.

On the other hand, the compound (I) has an extremely strong insecticidal activity, i.e. killing effect, on sanitary and agricultural injurious insects, and is markedly low in toxicity to mammals. However, the compound (I) is very low in K.D. effect, and hence is not usable as a domestic insecticide which is required to be rapid in K.D. effect, in practice.

As the result of extensive studies made for years on strong insecticides which are low toxic and quick-acting, the present inventor has found that when the compound (I) is mixed with the compound (II), the drawbacks of the two compounds are overcome and, surprisingly, the mixture of said two compounds can display marked synergistic actions not only in K.D. effect but also in killing effect which cannot be easily inferred from other mixtures and which cannot be easily elucidated theoretically.

Figure 1:
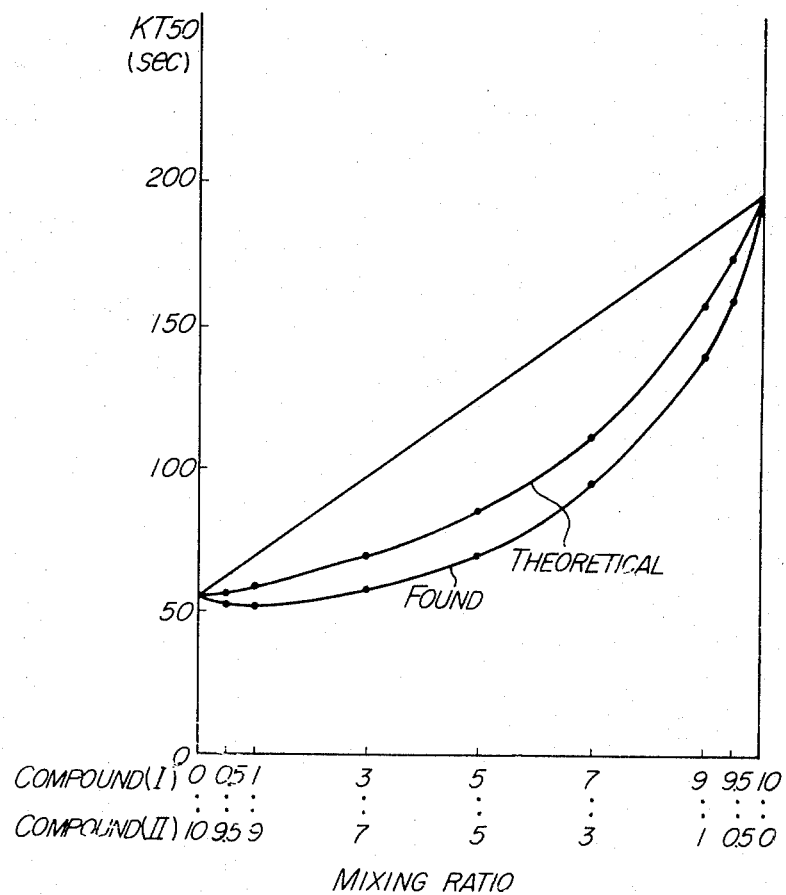
Figure 2:
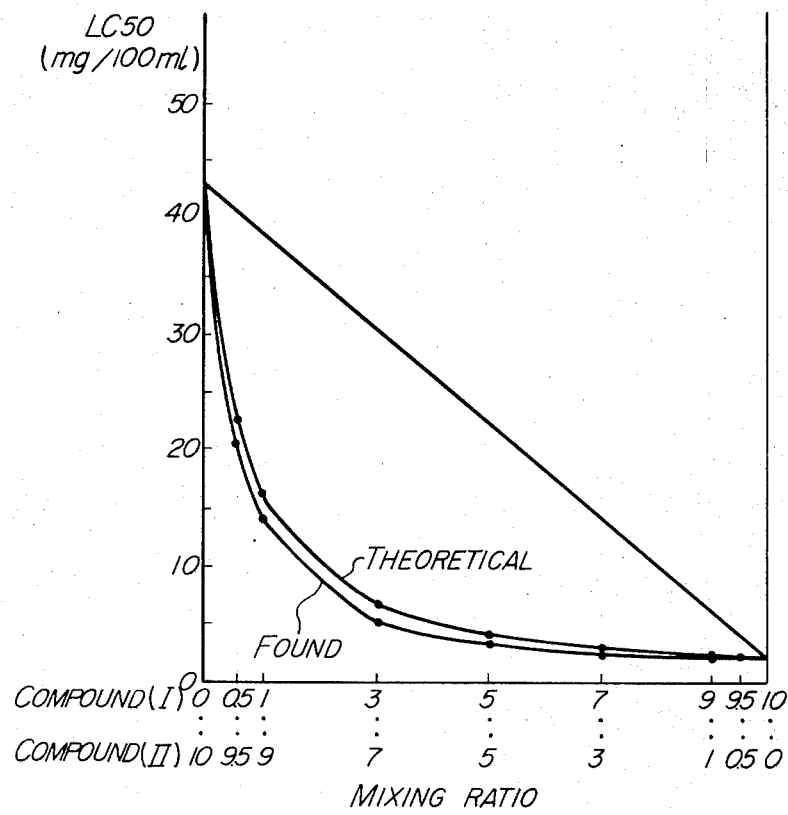
Figure 3:
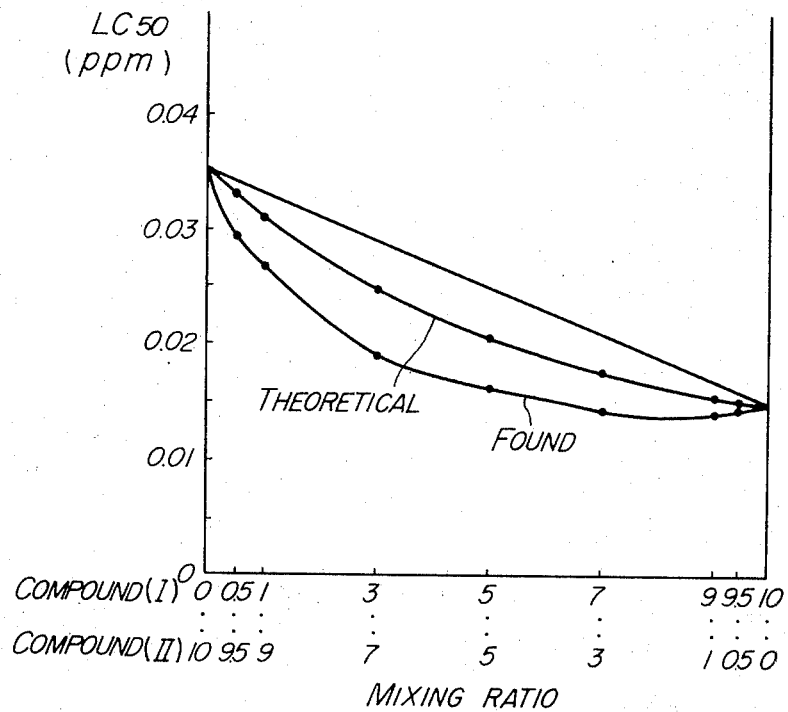

In the accompanying drawings, FIG. 1 shows the knock-down effects of the present compositions on houseflies, FIG. 2 shows the killing effects thereof on houseflies, and FIG. 3 shows the killing effects thereof on northern house mosquito larvae, all of which effects are represented by measured values and by theoretical values calculated according to the Yun-Pei Sun method.

The synergistic actions attained by mixing the compound (I) with the compound (II) are explained below with reference to experimental examples.

EXPERIMENTAL EXAMPLE 1

The compounds (I) and (II) were individually formulated by use of deodorized kerosene into 0.005%, 0.01%, 0.03%, 0.05%, 0.07%, 0.09%, 0.095% and 0.1% oil solutions. In the same manner as above, there were formulated 0.1% oil solutions of individual mixtures comprising the compound (I) and the compound (II) in such ratios as 0.5:9.5, 1:9, 3:7, 5:5, 7:3, 9:1 and 9.5:0.5.

On the other hand, housefly adults, which had elapsed 3–5 days after emergence, were liberated in a (70 cm.³) glass chamber. Into this glass chamber, 0.7 ml. of each of the samples prepared in the above was sprayed under a pressure of 100 pounds p.s.i. by use of an atomizer. Subsequently, the K.D. of the housefly adults was observed with lapse of time to measure the time required for 50% K.D. (hereinafter represented by "$KT_{50}$"). The results were as set forth in Table 1, and thus the two compounds obviously showed synergistic effects in K.D. Each of the values in the table is an average of runs repeated 5 times.

TABLE 1

| Oil solution of compound (I) | | Oil solution of compound (II) | | Oil solution of compound (I) and compound (II) | | | K.D. effect on houseflies | | | |
|---|---|---|---|---|---|---|---|---|---|---|
| Concentration (percent) | $KT_{50}$ (sec.) | Concentration (percent) | $KT_{50}$ (sec.) | Mixing ratio of compound (I): compound (II) | Concentration (percent) | $KT_{50}$ (sec.) | Mixing proportion | | Concentration of oil (percent) | $KT_{50}$ (sec.) found | $KT_{50}$ (sec.) theoretical [1] |
| | | | | | | | Compound (I) | Compound (II) | | | |
| 0.005 | >600 | 0.1 | 55 | | | | 0 | 10 | 0.1 | 55 | 55 |
| 0.01 | >600 | 0.095 | 57 | 0.5:9.5 | 0.1 | 52 | 0.5 | 9.5 | 0.1 | 52 | 57 |
| 0.03 | 537 | 0.09 | 66 | 1:9 | 0.1 | 53 | 1 | 9 | 0.1 | 53 | 59 |
| 0.05 | 405 | 0.07 | 92 | 3:7 | 0.1 | 58 | 3 | 7 | 0.1 | 58 | 70 |
| 0.07 | 319 | 0.05 | 135 | 5:5 | 0.1 | 70 | 5 | 5 | 0.1 | 70 | 87 |
| 0.09 | 244 | 0.03 | 219 | 7:2 | 0.1 | 95 | 7 | 3 | 0.1 | 95 | 113 |
| 0.095 | 217 | 0.01 | 440 | 9:1 | 0.1 | 142 | 9 | 1 | 0.1 | 142 | 161 |
| 0.1 | 204 | 0.005 | >600 | 9.5:0.5 | 0.1 | 164 | 9.5 | 0.5 | 0.1 | 164 | 180 |
| | | | | | | | 10 | 0 | 0.1 | 204 | 204 |

[1] The theoretical values were calculated according to the Yun-Pei Sun method.

From the above table, it is evident that when the compound (I) and the compound (II) are mixed each other in various proportions, the resulting insecticides are synergistically increased in K.D. effect. In order to further clarify the above-mentioned fact, the measured values set forth in Table 1 (No. 1) are shown in Table 1 (No. 2) together with theoretical values calculated according to the Yun-Pei Sun et al. method [J. Econ. Entomol. 53, pp. 887–891 (1960)] which is ordinarily employed in examining whether or not two chemicals used in admixture come to show a synergistic effect. Further, the said values may be represented by the curves shown in FIG. 1. Since the curve representing the measured values is below the curve representing the theoretical values calculated according to the Yun-Pei Sun method, it is substantiated that the insecticides comprising the compounds (I) and (II) have excellent synergistic effects.

EXPERIMENTAL EXAMPLE 2

The compound (I), the compound (II) and mixtures comprising the compounds (I) and (II) in such ratios as 0.5:9.5, 1:9, 3:7, 5:5, 7:3, 9:1 and 9.5:0.5 were individually formulated into oil solutions at various test concentrations. These oil solutions were individually measured in $LC_{50}$ value (50% lethal concentration) according to the Campbell's turn table method [Soap and Sanitary Chemicals, vol. 14, No. 6, 119 (1938)]. Subsequently, from the $LC_{50}$ values of the compound (I) and the compound (II), theoretical $LC_{50}$ values of the mixtures comprising the two compounds in various mixing proportions were calculated according to the aforesaid Yun-Pei Sun method.

The theoretical values and the measured values are shown in Table 2. As is clear from the table, the measured values are more excellent than the theoretical values no matter what mixing proportions are adopted, and therefore it is understood that the mixtures have been synergistically increased also in lethal effect.

TABLE 2

| Mixing proportion | | Lethal effect on houseflies | |
| --- | --- | --- | --- |
| Compound (I) | Compound (II) | $LC_{50}$ (mg./100 ml.) found | $LC_{50}$ (mg./100 ml.) theoretical [1] |
| 0 | 10 | 43 | 43 |
| 0.5 | 9.5 | 21.7 | 23.3 |
| 1 | 9 | 14.5 | 16.0 |
| 3 | 7 | 5.4 | 7.1 |
| 5 | 5 | 3.7 | 4.5 |
| 7 | 3 | 2.7 | 3.3 |
| 9 | 1 | 2.3 | 2.6 |
| 9.5 | 0.5 | 2.3 | 2.5 |
| 10 | 0 | 2.4 | 2.4 |

[1] The theoretical values were calculated according to the Yun-Pei Sun method.

3 and FIG. 3, and it is evident for the reason mentioned previously that the mixed insecticides comprising the compounds (I) and (II) in various mixing proportions have excellent synergistic effects.

TABLE 3

| Mixing proportion | | Lethal effect on northern house mosquitoes | |
| --- | --- | --- | --- |
| Compound (I) | Compound (II) | Measured $LC_{50}$ values (p.p.m.) | Theoretical $LC_{50}$ [1] value (p.p.m.) |
| 0 | 10 | 0.0356 | 0.0356 |
| 0.5 | 9.5 | 0.0290 | 0.0332 |
| 1 | 9 | 0.0271 | 0.0311 |
| 3 | 7 | 0.0186 | 0.0248 |
| 5 | 5 | 0.0169 | 0.0206 |
| 7 | 3 | 0.0154 | 0.0176 |
| 9 | 1 | 0.0140 | 0.0154 |
| 9.5 | 0.5 | 0.0137 | 0.0149 |
| 10 | 0 | 0.0145 | 0.0145 |

[1] The theoretical values were calculated according to the Yun-Pei Sun method.

EXPERIMENTAL EXAMPLE 4

The compound (I), the compound (II) and mixtures comprising the compounds (I) and (II) in a ratio of 1:1 were individually formulated into 0.4% oil-based and water-based aerosols. Each of the thus formulated aerosols was sprayed in an amount of 650±50 mg. into a (6 ft.)$^3$ Peet Grady's chamber. To the mist were exposed housefly adults, and the K.D. and insecticidal effects of the individual aerosols on the houseflies were observed.

The results were as shown in Table 4, and thus the aerosols containing the mixture of the compounds (I) and (II) obviously displayed synergistic effects.

TABLE 4

| Aerosol | Sprayed amount (mg./(6 ft.)$^3$) | K.D. (percent) | | | Mortality (percent) |
| --- | --- | --- | --- | --- | --- |
| | | 5 min. | 10 min. | 15 min. | |
| Oil-based aerosol of compound (I) | 690 | 8.0 | 35.8 | 83.5 | 83.5 |
| Oil-based aerosol of compound (II) | 690 | 34.1 | 69.3 | 95.4 | 40.2 |
| Oil-based aerosol of compound (I) plus compound (II) | 655 | 26.7 | 61.4 | 96.0 | 96.0 |
| Water-based aerosol of compound (I) | 670 | 6.0 | 40.9 | 86.8 | 86.8 |
| Water-based aerosol of compound (II) | 635 | 36.2 | 75.5 | 97.6 | 49.3 |
| Water-based aerosol of compound (I) plus compound (II) | 650 | 26.0 | 66.0 | 98.0 | 98.0 |

From the above table, it is evident that the mixed insecticides comprising the compounds (I) and (II) in various proportions had been synergistically increased in lethal effect. In order to further clarify the above-mentioned fact, the measured and theoretical $LC_{50}$ values of the mixed insecticides were represented by the curves as shown in FIG. 2, like in the case where the synergistic effects on K.D. effects were substantiated. As seen in FIG. 2, it is clear that the mixed insecticides comprising the compounds (I) and (II) in various proportions have been synergistically increased also in lethal effect.

EXPERIMENTAL EXAMPLE 3

The compound (I), the compound (II) and mixtures comprising the compounds (I) and (II) in such ratios as 0.5:9.5, 1:9, 3:7, 5:5, 7:3, 9:1 and 9.5:0.5 were individually formulated into 10% emulsifiable concentrates, which were then diluted with distilled water to prepare test liquids at various test concentrations. Each 200 ml. of the test liquids was charged in a 300 ml. beaker, and last instar larvae of northern house mosquitoes were liberated in the liquid. After 24 hours, the alive and dead of the larvae were observed to measure the $LC_{50}$ values (50% lethal concentrations) of the individual test liquids.

The measured $LC_{50}$ values of the mixed test liquids were compared with the theoretical values thereof calculated according to the aforesaid Yun-Pei Sun method to examine whether or not the mixed test liquids had synergistic effects. The results were as shown in Table The insecticidal compositions of the present invention can be formulated into oil solutions, dusts, emulsifiable concentrates, aerosols, granules, wettable powders and death-inducing powdery or solid preparations incorporated with baits or materials attractive for injurious insects, and can be shaped into forms ordinarily applied to chrysanthemate type insecticides, such as mosquito coils, fumigants, etc. Further, they can be easily prepared according to the ordinary procedures.

No matter what proportions are employed within a range of between 0.5:9.5 and 9.5:0.5, the present compositions display strong synergistic effects, but what proportion is to be adopted is dependent upon the purpose of application of the resulting composition.

The present invention is illustrated in further detail below with reference to examples, but it is needless to say that the scope of the invention is not limited by these examples.

EXAMPLE 1

0.2 g. of a homogeneous mixture comprising 1 part of the compound (I) and 9 parts of the compound (II) was dissolved in 99.8 g. of deodorized kerosene to obtain an oil solution.

EXAMPLE 2

0.4 g. of a homogeneous mixture comprising 5 parts of the compound (I) and 5 parts of the compound (II) was mixed with 7.1 g. of xylene and 7.5 g. of deodorized kerosene, and the resulting mixture was charged into an aerosol container. After attaching a valve portion to the container, 85 g. of a propellant (e.g. Freon, vinyl chloride monomer or liquefied petroleum gas) was filled under pressure through said valve portion into the container to obtain an aerosol.

EXAMPLE 3

0.4 g. of a homogeneous mixture comprising 3 parts of the compound (I) and 7 parts of the compound (II) was mixed with 13.6 g. of deodorized kerosene and 1.0 g. of Atmos 300 (registered trade name for an emulsifier produced by Atlas Chemical Industries, Inc.). The resulting mixture was emulsified with addition of 50 g. of pure water and then filled into an aerosol container together with a 3:1 mixture of deodorized butane and deodorized propane obtain a water-based aerosol.

EXAMPLE 4

20 g. of a homogeneous mixture comprising 7 parts of the compound (I) and 3 parts of the compound (II) was mixed with 25 g. of Sorpol 2020 (registered trade name for an emulsifier produced by Toho Chemical Co.) and with 55 g. of xylene in this order to obtain a homogeneous emulsifiable concentrate.

EXAMPLE 5

50 g. of a homogeneous mixture comprising 5 parts of the compound (I) and 5 parts of the compound (II) was thoroughly mixed with 1.5 g. of Sorpol 5029 (registered trade name for an emulsifier produced by Toho Chemical Co.) and with 3.5 g. of lignin. The resulting mixture was thoroughly stirred together with 45 g. of diatomaceous earth in a mortar to obtain a wettable powder.

EXAMPLE 6

1 g. of a homogeneous mixture comprising 2 parts of the compound (I) and 8 parts of the compound (II) was dissolved in 30 ml. of acetone. The resulting solution was thoroughly kneaded in a mortar with 99 g. of 300 mesh diatomaceous earth, and then the acetone was removed by vaporization to obtain a dust.

EXAMPLE 7

1 g. of a homogeneous mixture comprising 2 parts of the compound (I) and 8 parts of the compound (II) was dissolved in 20 ml. of methanol. The resulting solution was homogeneously mixed with 99 g. of a mosquito coil carrier (a 3:5:1 mixture of Tabu powder, pyrethrum marc and wood flour). After removing the methanol by vaporization, the mixture was thoroughly kneaded with 150 ml. of water and then shaped and dried to obtain a mosquito coil.

(e.g. felt), and then the methanol was removed by vaporization to obtain an insecticidal sheet for electric heating. The thus obtained sheet was placed on an electrically heated plate, whereby the same purpose as that of a mosquito coil could be accomplished.

Insecticidal effects of several of the present compositions obtained in the above manner are shown below with reference to test examples.

TEST EXAMPLE 1

Into a (78 cm.$^3$) glass chamber were liberated about 50 housefly adults, and 0.7 ml. of the oil solution obtained in Example 1 was uniformly sprayed into the chamber under a pressure of 10 pounds by use of a glass atomizer, whereby more than 90% of the houseflies could be knocked-down within 5 minutes and more than 90% thereof could be killed on the next day.

TEST EXAMPLE 2

A plastics cylinder of 14 cm. in inner diameter and 7 cm. in height was covered at the lower part with a wire net. Into the cylinder were liberated 10 cockroaches (*Periplaneta fuliginosa*), and then the cylinder was covered also at the upper part with a wire net. Subsequently, the cylinder was placed at the lower part of a Nagasawa's mist settling apparatus (Sumio Nagasawa: "Bochu Kagaku (Science of Insect Control)," vol. 18, pp. 183–192, 1953), and each of the aerosols obtained in Examples 2 and 3 was sprayed directly to the cockroaches through the upper part of the apparatus. After spraying the aerosol, K.D. ratio of the insects was observed with lapse of time. 20 minutes thereafter, the cockroaches were transferred to and fed in another rearing cage, and the alive and dead thereof were observed after 3 days. The results were as shown in Table 5.

TABLE 5

| Insecticidal composition | Average dose (kg.) | K.D. ratio with lapse of time (percent) | | | | | | Mortality (percent) |
|---|---|---|---|---|---|---|---|---|
| | | 2 min., 30 sec. | 5 min. | 7 min. | 10 min. | 15 min. | 20 min. | |
| Aerosol of Example 2 | 500 | 60 | 75 | 95 | 100 | 100 | 100 | 100 |
| Aerosol of Example 3 | 485 | 45 | 70 | 90 | 100 | 100 | 100 | 100 |
| OTA [1] | 470 | 20 | 35 | 50 | 60 | 70 | 95 | 85 |

[1] OTA (Official Test Aerosol): Official Test Aerosol of the Chemical Specialties Manufacturers, U.S.A. That is, OTA is a standard aerosol used throughout the world for insecticidal effect test which has been prepared by the Chemical Specialties Manufacturers Association of the U.S., and contains 0.4% of natural pyrethrin and 2% of DDT.

TEST EXAMPLE 3

Each of an aqueous 200 times-diluted liquid of the emulsifiable concentrate obtained in Example 4 and an aqueous 500 times-diluted liquid of the wettable powder obtained in Example 5 was uniformly dropped by use of a pipet onto the surface of a (15 cm.$^2$) plywood so that the proportion of the liquid became 50 ml./m.$^2$, and then dried in air. About 20 housefly adults were liberated in a cylindrical wire net of 9 cm. in diameter and 1 cm. in height, and were contacted with the surface of the plywood treated in the above manner, and the number of knocked-down insects was counted with lapse of time. After 30 minutes' contact, the houseflies were transferred to and fed in a rearing cage, and the alive and dead thereof were observed after one day. The results were as shown in Table 6.

TABLE 6

| Insecticidal composition | K.D. ratio with lapse of time (percent) | | | | | | | Mortality (percent) |
|---|---|---|---|---|---|---|---|---|
| | 2 min., 30 sec. | 5 min. | 7 min. | 10 min. | 15 min. | 20 min. | 30 min. | |
| 200 times-diluted liquid of the emulsifiable concentrate of Example 4 | 59.0 | 75.0 | 98.0 | 100 | 100 | 100 | 100 | 100 |
| 500 times-diluted liquid of the wettable powder of Example 5 | 72.4 | 94.0 | 97.0 | 100 | 100 | 100 | 100 | 100 |
| 0.1% solution of pyrethrin | 0 | 3.2 | 36.8 | 75.8 | 88.4 | 94.7 | 98.9 | 30.5 |

EXAMPLE 8

1 g. of a homogeneous mixture comprising 2 parts of the compound (I) and 8 parts of the compound (II) was dissolved in 20 ml. of methanol. A given amount of the resulting solution was dropped onto a fibrous material

TEST EXAMPLE 4

A glass Petri dish of 14 cm. in inner diameter and 7 cm. in height was coated on the inner wall with butter, leaving at the lower part an uncoated area of about 1 cm. in width. Onto the bottom of the dish, the dust obtained in Example 6 was uniformly dusted in a proportion of 2 g./m.² Subsequently, 10 German cockroach adults were liberated in the dish and contacted with the dust, and the number of knocked down insects was counted with lapse of time. After 10 minutes, the cockroaches were transferred to another vessel, and the alive and dead thereof were observed after 3 days. The results were as shown in Table 7.

TABLE 7

| Insecticidal composition | K.D. ratio with lapse of time (percent) | | | | | Mortality (percent) |
|---|---|---|---|---|---|---|
| | 38 sec. | 1 min., 15 sec. | 2 min., 30 sec. | 5 min. | 10 min. | |
| Dust of Example 6 | 60.0 | 100 | 100 | 100 | 100 | 100 |

TEST EXAMPLE 5

About 20 adults of northern house mosquitoes were liberated in a (70 cm.³) glass chamber. 1 g. of the mosquito coil obtained in Example 7 was ignited on both ends and placed at the center in the chamber. Thereafter, the number of knocked-down mosquitoes was counted to calculate the $KT_{50}$ value (time required for 50% K.D.) and the mortality (kill percent) of the insects to obtain the results shown in Table 8.

TABLE 8

| Insecticidal composition | K.D. effect ($KT_{50}$) (min.-sec.) | Mortality (kill percent) |
|---|---|---|
| Mosquito coil of Example 7 | 6'06'' | 100 |
| Mosquito coil containing 0.5% of allethrin | 6'24'' | 56.5 |

Further, housefly adults were treated in the same manner as above to obtain the $KT_{50}$ values and mortality as shown in Table 9.

TABLE 9

| Insecticidal composition | K.D. effect ($KT_{50}$) (min.-sec.) | Mortality (kill percent) |
|---|---|---|
| Mosquito coil of Example 7 | 7'54'' | 100 |
| Mosquito coil containing 0.5% of allethrin | 8'36'' | 29.8 |

What is claimed is:

1. An insecticidal composition comprising an insecticidally effective amount of a mixture of 5-benzyl-3-furylmethyl d-trans-chrysanthemate and N-(3,4,5,6-tetrahydrophthalimido)-methyl d-trans-chrysanthemate, in a ratio of between 0.5:9.5 and 9.5:0.5.

References Cited

UNITED STATES PATENTS 3,268,551   8/1966   Koramoto et al. ____ 424—306 X
3,542,928   11/1970  Elliott _____ 424—306 X

OTHER REFERENCES

J. Econ. Entomology 53, 887–91 (1960).

ALBERT T. MEYERS, Primary Examiner

L. SCHENKMAN, Assistant Examiner

U.S. Cl. X.R.

424—285